Patented Nov. 23, 1926.

1,607,666

UNITED STATES PATENT OFFICE.

WILHELM DE HAËN, OF HANOVER, GERMANY.

PROCESS OF MANUFACTURING COLLOIDAL PHOSPHATE FERTILIZERS.

No Drawing. Application filed January 20, 1925, Serial No 3,687, and in Germany July 16, 1921.

This invention refers broadly to a process of preventing the so-called reversion of available phosphoric acid in phosphate fertilizers and among other objects and advantages it is intended to dispense with the use of complicated and expensive machinery and chemicals and particularly of strong mineral acids, such as sulphuric acid and to provide a product in which the phosphoric acid is directly assimilable by the plants irrespective of the particular composition of the phosphates to be treated, and regardless of the presence of impurities, such as iron or alumina which in the ordinary chemical processes greatly interferes with the permanency and the availability of the assimilable phosphoric acid. My invention broadly considered comprises means to convert the phosphoric acid of phosphates or the like, or phosphoric acid compound into a highly dispersed colloidal condition without the use of complicated machinery or mechanical and chemical processes, and preferably by the employment of dispersoids or peptizing agents which are readily available, and are by themselves readily assimilable and beneficial for the plant growth.

It has already been suggested in the previous art to treat phosphate rock or other phosphates or material containing phosphoric acid with a view of obtaining colloidal phosphates which are readily absorbed and assimilated by the plants by submitting them to an intimate grinding process by rapidly rotating colloidal grinding mills, beating mills and the like with or without the presence of protective colloids. It has also been suggested to obtain readily assimilable phosphates by an intense and vigorous mechanical disintegrative action in the presence of water, and mostly with alkali and at comparatively high temperatures. These methods of treatment, however, are objectionable from various causes. In all machines of the kind referred to there is the drawback that they require a very high number of revolutions with the result that the material to be ground has to be introduced in a very liquid condition requiring a large addition of water, on an average about six times the amount of the solid substance employed. In view, however, of the fact that the product to be obtained, in order to be applied upon the field by strewing and distributing machines, has to be employed preferably in the dry and pulverulent condition, the amount of water that has been subsequently added, must be removed again, so that the course of manufacture is thereby rendered very expensive, and uneconomical. Add to this the inconvenience of the extraordinary consumption of power of such rapidly rotating dispersing machinery and their rather low efficiency which is out of proportion to their costs and running expenses, particularly in view of the fact that rather immense quantities of raw phosphates are to be treated that have to be employed in agriculture at the rate of hundred thousands of tons. It is, therefore, of prime importance to devise means of avoiding these drawbacks, and to manufacture large quantities of phosphates for the arts with a high percentage of available phosphoric acid by the use of as small an amount of liquid as possible.

It has been repeatedly shown, and has been proved by my researches that it is not possible to produce a colloidal or at least a perfectly colloidal product by even prolonged mere grinding of phosphates with but little water in slowly running grinding devices, but I have found in the course of my experiments that it is possible by the addition of peptizing agents of a certain description, mostly agents containing lignin or compounds thereof, to produce colloidal phosphates of great efficiency and on a commercial scale in the presence of only small quantities of water. Peptizing agents suggested by the prior art, such as phosphoric acid, tannin, the alkali compounds of the lysalbic acid or the like could either only be employed in the presence of large quantities of water, or they required the employment of very rapidly rotating grinders, and their employment was not a commercial success. In accordance with my invention however, it has been ascertained that there is but a certain class of peptizing agents which is adapted for the colloidal dispersion of phosphates in ordinary slowly acting grinders in the presence of limited quantities of water. A great number of peptizers of usually very great efficiency which are successfully employed in connection with other systems, have been found to be wholly unsuitable for the colloidization of raw phosphates, among which I may mention ordinary phosphoric acid, meta-phosphoric acid, pyro-phosphoric acid, and their alkali salts, phosphates and acid-phosphates of alkali, urea, sodium-naphthenate, sodium-naphthen-sulphonate, glue, molasses, and only after a large series of very painstaking experiments a certain class of peptizers has been discovered by means of which the satisfactory colloidization of raw phosphates, phosphate rock and the like, may be accomplished in the presence of but little water and in slowly rotating or moving grinding and disintegrating devices.

In accordance with my experiment specifically beneficial results in the peptization of raw phosphates and the colloidal dispersion thereof and of other fertilizers containing phosphoric acid have been obtained with substances, containing lignin or humus, that is to say, decomposition or putrefaction products of vegetable fibers and the like such as salts of the lignin-acids, such as described for instance by Schwalbe, Chemie der Zellulose 1911, page 404, and Ullmann, Enzyclopädie der technischen Chemie, vol. 6 (1915) page 417. Thus I may use with advantage for instance, spent liquor from the manufacture of pulp by the soda process, salts of the lignin-sulpho-acids, such as spent sulphite liquor, recent mineral coals, such as humus-coal, brown coal, lignite, peat, peat dust. Such coals of recent formation exercise their peptizing action particularly when employed in combination with the liquor from the manufacture of soda-fiber pulp, and by a judicious application of the agents referred to the peptization of the phosphates has become an industrial and commercial success. The new process permits the employment of easily obtainable peptizing agents, and allows of a colloidization in slow acting grinders with great economy of power and in the presence of a minimum of water, so as to be fully adapted to the particular requirements of the large quantities of material and of assimilable phosphate needed in agriculture. As instances I may mention in this connection that, from a series of fertilizing tests made with the products according to my invention in connection with the raising of barley, and potatoes on clay soil it has been ascertained that, as compared with superphosphate fertilizers the yield is increased to about 2¼ to 2½ times the amount and as compared with the use of Thomas-meal to nearly twice the amount. This fact and the possibility of entirely dispensing with the use of sulphuric acid and other expensive and difficultly manipulated chemicals in the manufacture of the novel assimilable phosphates render it of the greatest commercial and industrial importance. As an instance of the kind of grinding or ball mills employed in the execution of my invention I may mention a mill of, say 1100 (eleven-hundred) millimeters diameter, and making from about 20 to 30 revolutions a minute or somewhat more. As a rule, my invention in contradistinction to the processes above referred to, which depend upon the employment of rapidly operating colloidal mills of an average peripheral velocity of thousand meters and more per minute, makes use of comparatively slowly revolving grinders, such as ball mills or tubular mills, as described for instance in "Chemische Technologie in Einzeldarstellungen," Leipzig 1911, page 115 (Naske, disintegrators). The course of manufacture will more clearly appear from the following examples.

*Examples.*

1. 400 pounds of powdered phosphorite rock are submitted to the action of 80 lbs. spent liquor from the manufacture of soda pulp with 50% dry substance for, say, 30 hours. In order to facilitate grinding of the mass 200 lbs. of water are added. The exceedingly finely distributed muddy slimes obtained are dried at low temperature and powdered. The resulting product may be easily subdivided in water, so as to constitute a light-brown milk-like emulsion the colloidal portions of which remain suspended for a long time and are so exceedingly fine that they can be rinsed down by the rain and introduced into the deepest and most delicate fissures of the soil.

If it is desired to remove or subdivide the residue of the substance which has remained undecomposed, the muddy slime discharge from the mill is diluted and submitted to a lixiviating and silting operation, thereby causing the coarser particles to settle to the bottom, while the supernatant liquid may be siphoned off. This liquid is then concentrated in any suitable manner, and may be dried like the product not submitted to such lixiviating and silting action.

2. 400 pounds of phosphorite are ground for 60 hours in an edge runner or ball mill with 80 pounds humus-coal or so-called Cassel Brown (a kind of carbon) and with 220 lbs. of water. The mass is then further treated, as described with reference to Example 1. The invention has been described heretofore in its broad aspects only, and it should be understood that it is susceptible of various modified forms of execution to be governed by different modes of applications, mode and apparatus of manufacture and the convenience of the operator, and without deviating from the spirit of my invention, as particularly set forth in the claims hereunto appended. The invention is applicable to any kind of phosphoric acid fertilizers, such as earthy phosphates, phosphate rock, Thomas slags, and slag meal and to amorphous substances, containing phosphoric acid. Mixtures of various substances adapted to produce colloidization may be used. A further increase of fine subdivision may be obtained by submitting the material to a retting, rotting or similar treatment, comparable to the retting or fibrous material with or without combination with the treatment above referred to. This procedure may possibly be due to the evolution of some organic acid or the like, adapted to increase the assimilable properties of the phosphate rock, similar somewhat to the well-known action of citric acid utilized in the analysis of these products. Inasmuch as the humus possesses acid reaction, a small amount of potash may be added to remove the acidity and to aid in the colloidization. After the desired degree of dispersion is obtained, the alkali may be again combined with acid, so as to liberate the humic acid. The humic acid then continues to act as a protecting colloid. The final product thus obtained may be further improved by submitting it to a kind of rotting or resolving action or by a fractional lixiviating or silting treatment or by a combination of these treatments.

I claim:—

1. The method of treating and colloidally dispersing phosphatic material and rendering the same readily assimilable, which consists in treating such material with humus-colloids at low temperature and with moderate grinding in the presence of water.

2. The method of treating phosphatic material and of rendering the same readily assimilable, which consists in causing humin substances to act thereon at moderate temperatures and with moderate grinding in the presence of water.

3. The method of treating and of colloidally dispersing phosphatic material and of rendering the same readily assimilable, which consists in submitting such material to prolonged decomposing action of organic humic substances at moderate temperatures and with moderate grinding and in the presence of water.

4. The method of treating and colloidally dispersing phosphatic material, which consists in treating such material at moderate temperatures with finely divided organic humus-constituents and with moderate grinding in the presence of water, allowing the coarser particles to settle, concentrating the supernatant slimes, and drying the same.

5. The method of treating and of colloidally dispersing phosphatic material and of increasing the assimilability thereof, which consists in treating such material with substances containing lignin at low temperatures, and finely subdividing the material with moderate grinding in the presence of water.

6. The method of treating and of colloidally dispersing phosphatic material and of increasing the assimilability thereof, which consists in treating the same with humus-constituents of acid reaction in the presence of a small amount of alkaline agents to remove the acidity and at moderate temperature and moderately grinding the mixture in the presence of water, then neutralizing the alkali to liberate the humic acid, and removing the coarser particles of the mixture.

7. The method of treating and of colloidally resolving and dispersing phosphatic material, which consists in treating the same at moderate temperature and with moderate grinding with humus colloids and water, submitting the mixture to silting action, and removing the coarser particles.

8. The method of manufacturing phosphate fertilizers, which consists in treating phosphate material with peptizing decomposition products, containing lignin and humin-compounds, and submitting the mixture to a slow moderate grinding action at ordinary temperature and with a moderate quantity of water.

9. The process of manufacturing assimilable phosphate fertilizers, which consists in treating and slowly grinding phosphate material with spent soda-liquor from the manufacture of soda-pulp at low temperature, until a finely dispersed muddy slimy compound is obtained.

10. The method of manufacturing phosphate fertilizers, which consists in treating phosphate material with alkaline peptizing decomposition products containing lignin-substances in the presence of water, submitting the mixture to a slow moderate grinding action at low temperature, distributing the resulting product in water, separating the muddy liquor from the coarser particles and drying and subdividing said muddy liquor.

11. The process of manufacturing phosphate fertilizers, which consists in slowly grinding and agitating phosphate material in excess with smaller amounts of colloidal humin and lignine-compounds in the presence of moderate amounts of water.

Dr. Phil. W. de HAËN.